United States Patent Office 2,994,085
Patented July 25, 1961

2,994,085
PROCESS FOR THE CURING OF MEATS
Jacob Teich, Hackensack, and Herman A. Lipkovitz, Teaneck, N.J.
No Drawing. Filed Aug. 20, 1956, Ser. No. 605,216
1 Claim. (Cl. 99—159)

Our process relates generally to the curing of meats and specifically to a process for the curing of meat to stabilize moisture content, weight, color, texture, and appearance both during the curing process and during the final preparation of the meat by the consumer.

It is among the objects of our invention to treat meats to stabilize their moisture content and weight both during the curing process and during the final preparation of the meat by the consumer.

It is another object of our invention to treat meats to stabilize color so as to minimize undesirable color changes both during and after curing.

It is yet another object of our invention to treat meats to stabilize and enhance their natural flavors which might otherwise be impaired during curing and cooking.

It is still a further object of our invention to treat meat to prevent it from becoming tough and stringy in the curing process thereby producing a more tender final product for the consumer.

It is still a further object of our invention to provide an addition agent for cured meats which will stabilize color and minimize undesirable color changes both during and after the curing process.

Still a further object of our invention is to provide an addition agent for a variety of cured meats including, among others, sausage, frankfurters, bologna, ham, bacon, beef, and cured poultry.

A further object of our invention is to provide an improved process for curing meats in which the control of pH affects the quality of the product.

Still a further object of our invention is to provide a process for curing meats in which the usual sugar additives may be eliminated.

These objects and advantages, as well as other objects and advantages, may be achieved by the methods, procedures and uses of products set forth in the following specification.

The curing of meats is a complex process which heretofore has been carried out under rigidly controlled conditions of temperature, pH, concentration of curing agents, and timing of the various steps. For instance, if the concentration of the curing salts is too high or too low, the final product may be a discolored brown or green. If the pH is too low, discoloration of the meat by the nitrite salts may occur, whereas if it is too high, the growth of undesirable organisms may occur. Furthermore, over-curing or over-cooking may drive water out of the meat, producing a less firm body with a string texture.

We have found that by employing the extract of malted barley grains with the usual curing agents, a final product having the desired color, taste, texture, and weight stability is produced. In addition, sugar may be eliminated since the malt extract will supply its own characteristics in the curing process.

The process for making extract of malted barley grain is well known and commonly used in the baking and brewing industries. The following is a description of a well-known process for producing such an extract.

The barley is first soaked in water until it has taken on a moisture content of approximately 45% by weight. The malting phase follows in which the grain is caused to artificially germinate under controlled conditions of temperature, moisture, and air supply. The germination is permitted to proceed until the acrospire has grown to about seven-eights of the length of the berry; at this time germination is arrested by drying under controlled conditions and at temperatures not high enough to inactivate the diastase and proteolytic enzymes. During the germination phase, enzymes known as cystase, diastase, and protease are developed and change the composition of the cellular structure of the barley, although the outward appearance changes little except for the acrospires. The carbohydrates have become more friable, the nitrogenous substances as well as the natural mineral components have became amenable to solution and action by enzymes developed in the malting phase. The enzyme cystase has the ability of dissolving the cell wall of the raw starch granules of the grain, making the contents available for the action of diastase which in turn has the power of converting the starch into maltose sugar, along with some dextrin and malto-dextrin. The proteases have the power of changing the protein present into simpler forms which will be readily soluble in water.

After drying, the sprouts are mechanically removed and the malt is mascerated and mixed with water, varying the temperature of the water so as to permit the developed enzymes to react on the components each at its optimum reaction temperature. In this way, the maltose, soluble protein and mineral salts of the barley malt pass into solution in the water present during the mascerating phase. The spent grain is filtered off and washed several times to remove all of the soluble components. The resulting liquid or extract is concentrated until it contains approximately 25% or less of water, whereupon it becomes resistant to invasion by micro-organisms and can be stored for later use.

The concentration of the constituents of the final malt extract will vary according to the temperatures employed in the mascerating phase. The constituents may very within the following ranges:

(1) Maltose—30% to 90% on a dry basis
(2) Dextrin—5% to 70%
(3) Proteins—3% to 7%
(4) Lactic acid—½% to 2%
(5) Minerals—traces only
(6) Water—no more than 25%; preferably 20% or less so that the solution will be resistant to attack by microorganisms which would cause fermentation of the extract.

An analysis of a typical malt extract derived from the conventional process may be:

| | Percent |
|---|---|
| Solids | 58.32 |
| Reducing sugars as maltose | 42.38 |
| Acidity, as lactic acid | 1.02 |
| Ash | 1.36 |
| Protein (Nx 6.25) | 4.64 |
| Dextrins and malto-dextrins (by difference) | 8.93 |

In use, malt extract as an addition agent is added to any pickling solution and the curing process carried out in the following manner. A pickling solution is compounded, for example, by adding the extract of malted barley to a solution of sodium chloride in water in amounts from four to seven ounces on a dry basis of pure extrct to each gallon of brine solution. To this, sodium nitrate in amounts of approximately .02 of a pound per gallon of brine, and sodium nitrite in amounts of approximately .01 of a pound per gallon of brine is added. Spices are added. The usual sugar may be added if desired, but this is not essential. In addition, various phosphates may be added if desired, but this, too, is not essential. A typical pickling solution prepared in this manner would comprise:

| | | |
|---|---|---|
| Water | gallons | 100 |
| Sodium chloride | lbs | 80 |
| Sodium nitrate | lbs | 2 |
| Sodium nitrite | lb | 1 |
| Extract of malted barley | lbs | 40 |
| Spices in desired quantity. | | |

The pH of the final pickling solution must be checked to be certain that it is no lower than 6.0, otherwise a bleaching effect on the meat might ensue.

In a typical curing process, 100 gallons of a pickling solution prepared in the example above was employed to cure 1,000 lbs. of ham. The hams were injected with the pickling solution by forcing a quantity under pressure through the main arteries at the shank of the ham until there was a weight increase of approximately 10%. The hams were then immersed in the balance of the solution for 24 hours after which they were removed and hung in a smokehouse. The temperature in the smokehouse was maintained at 120° F. for the first three hours, at 140° F. for the next three hours, and at 160° F. for the four final hours completing the smoking phase. The hams were then removed to a refriegrator and kept at 45° F. for 24 hours after which time they were ready for distribution. A control batch of hams cured in a pickling solution of a typical composition which did not contain malt extract showed a weight loss of 3 to 4% after smoking and cooling. On the other hand, hams cured with malt extract showed a weight gain of approximately 10% after smoking and cooling.

A selection of hams cured by the two different pickling solutions disclosed that upon being cooked by holding, those prepared in the solution containing malt extract showed twelve percent less shrinkage than those prepared in the conventional manner. Moreover, hams prepared with the malt extract showed a more desirable color as well as flavor and texture both during and after final cooking.

As has been previously noted, the concentration of the various components of our addition agent for a pickling solution may be varied within stated bounds. In particular, the concentration of the malt extract may be varied according to the type and cut of meat to be cured. Moreover, other conventional ingredients such as sugar and phosphate salts may be added if so desired, but their presence is not essential to the results noted above.

The foregoing procedures and materials, as well as the use thereof, is intended to be merely illustrative of our invention, for many changes may be made in the formulation of the products and the methods of procedure, all within the scope of the appended claim without departing from the spirit of the invention.

We claim:

A process for curing meats which comprises admixing an aqueous solution of malt extract with a brine to form a meat treating solution having 4–7 ounces malt extract for each gallon brine, said solution of malt extract consisting essentially of 30–90% by weight maltose, 5–70% by weight dextrin, 3–7% by weight protein and 0.5–2% by weight lactic acid in a maximum of 25% water, and said brine containing sodium chloride, sodium nitrate and sodium nitrite in a proportion to provide said meat treating solution with 1 part by weight malt extract, 2 parts by weight sodium chloride, 0.5 part by weight sodium nitrate and 0.25 part by weight sodium nitrite, said meat treating solution also having a pH of 6.0, immersing the meat in said meat treating solution for a period of 24 hours, smoking the meat at 120° F. for 3 hours, increasing the smoking temperature to 140° F. for 3 hours, continuing the smoking operation at 160° F. for 4 more hours, and refrigerating the smoked meat for 24 hours at a temperature of 45° F.

References Cited in the file of this patent
UNITED STATES PATENTS

| | | |
|---|---|---|
| 1,385,352 | Allen | July 26, 1921 |
| 2,513,094 | Hall | June 27, 1950 |
| 2,528,204 | Zwosta | Oct. 31, 1950 |
| 2,681,287 | Starr | June 15, 1954 |
| 2,688,556 | Komarik et al. | Sept. 7, 1954 |